(12) United States Patent
Bennion

(10) Patent No.: US 10,182,308 B2
(45) Date of Patent: Jan. 15, 2019

(54) CONTENT MATCHING SYSTEM FOR A NETWORKED MEDIA PLAYER

(71) Applicant: Western Digital Technologies, Inc., Irvine, CA (US)

(72) Inventor: Matthew Bennion, Dana Point, CA (US)

(73) Assignee: Western Digital Technologies, Inc., San Jose, CA (US)

(*) Notice: Subject to any disclaimer, the term of this patent is extended or adjusted under 35 U.S.C. 154(b) by 63 days.

(21) Appl. No.: 14/244,306

(22) Filed: Apr. 3, 2014

(65) Prior Publication Data

US 2015/0264159 A1  Sep. 17, 2015

Related U.S. Application Data

(60) Provisional application No. 61/951,921, filed on Mar. 12, 2014.

(51) Int. Cl.
*H04W 4/02* (2018.01)
*H04L 29/08* (2006.01)
(Continued)

(52) U.S. Cl.
CPC .......... *H04W 4/021* (2013.01); *H04L 65/4084* (2013.01); *H04L 67/22* (2013.01); *H04L 67/306* (2013.01)

(58) Field of Classification Search
CPC .......... G06F 21/10; G06F 21/62; G06F 21/71; G06F 2221/0711; H04L 2209/603; H04L 9/0894; H04L 9/08; H04L 9/0866; G11B 20/00115; G11B 20/00123; G11B 20/00137; G11B 20/00246; G11B 2220/20; G11B 2020/10888; G11B 2020/1232; G11B 2020/1267; H04N 21/4122;
(Continued)

(56) References Cited

U.S. PATENT DOCUMENTS 6,499,054 B1   12/2002  Hesselink et al.
6,732,158 B1    5/2004  Hesselink et al.
(Continued)

FOREIGN PATENT DOCUMENTS

WO    2005022321    3/2005

OTHER PUBLICATIONS

International Search Report and Written Opinion dated May 27, 2015 from related PCT Serial No. PCT/US2015/020301, 10 pages.
(Continued)

*Primary Examiner* — Chris Parry
*Assistant Examiner* — Abderrahmen Chouat
(74) *Attorney, Agent, or Firm* — Chang & Hale LLP

(57) ABSTRACT

Embodiments of a content selection system are disclosed, wherein the system is configured to obtain location information from a plurality of computing devices. The content selection system identifies a selection of computing devices that are within a set distance (e.g., within viewing and/or listening distance) from a networked, media playback device. The content selection system determines media content preferences of users associated with the selection of computing devices. The content selection system select a first media content for playback on the networked media player based at least partly on the media content preferences of the users.

20 Claims, 2 Drawing Sheets

(51) Int. Cl.
*H04W 4/021* (2018.01)
*H04L 29/06* (2006.01)

(58) Field of Classification Search
CPC ........... H04N 21/4126; H04N 21/4325; H04N 21/4334; H04N 21/43635; H04N 21/4627; H04N 21/47217; H04N 5/4403; H04N 5/765; H04N 5/913; H04N 9/8205
USPC ......... 705/14.55, 14.51, 14.44, 14.64, 14.58, 705/14.66, 26.7, 347, 14.13, 14.23, 14.25, 705/14.36, 14.4, 14.53, 14.54, 14.63, 705/14.68, 14.69, 26.41; 709/219, 203, 709/204, 206, 224, 202, 225, 230; 725/25, 14, 34, 10, 114, 119, 12, 134, 21, 725/31, 32, 37, 43, 45, 68, 71, 82; 707/E17.014, E17.044, 770, E17.001, 707/E17.009, E17.101, 736, 737, 747, 707/748, 758
See application file for complete search history.

(56) References Cited

U.S. PATENT DOCUMENTS

| | | | |
|---|---|---|---|
| 7,120,692 B2 | 10/2006 | Hesselink et al. |
| 7,454,443 B2 | 11/2008 | Ram et al. |
| 7,467,187 B2 | 12/2008 | Hesselink et al. |
| 7,469,283 B2 | 12/2008 | Eyal et al. |
| 7,546,353 B2 | 6/2009 | Hesselink et al. |
| 7,587,467 B2 | 9/2009 | Hesselink et al. |
| 7,600,036 B2 | 10/2009 | Hesselink et al. |
| 7,788,404 B2 | 8/2010 | Hesselink et al. |
| 7,917,628 B2 | 3/2011 | Hesselink et al. |
| 7,934,251 B2 | 4/2011 | Hesselink et al. |
| 8,004,791 B2 | 8/2011 | Szeremeta et al. |
| 8,060,525 B2 | 11/2011 | Svendsen et al. |
| 8,255,661 B2 | 8/2012 | Karr et al. |
| 8,285,965 B2 | 10/2012 | Karr et al. |
| 8,341,117 B2 | 12/2012 | Ram et al. |
| 8,341,275 B1 | 12/2012 | Hesselink et al. |
| 8,352,567 B2 | 1/2013 | Hesselink et al. |
| 8,526,798 B2 | 9/2013 | Hesselink |
| 8,631,284 B2 | 1/2014 | Stevens |
| 8,646,054 B1 | 2/2014 | Karr et al. |
| 8,661,507 B1 | 2/2014 | Hesselink et al. |
| 8,688,797 B2 | 4/2014 | Hesselink et al. |
| 2005/0144195 A1 | 6/2005 | Hesselink et al. |
| 2005/0144200 A1 | 6/2005 | Hesselink et al. |
| 2008/0091717 A1* | 4/2008 | Garbow ............ G06F 17/30749 |
| 2010/0315549 A1* | 12/2010 | Basso ................ H04N 21/2389 348/445 |
| 2011/0246560 A1 | 10/2011 | Gibson |
| 2011/0314502 A1* | 12/2011 | Levy ..................... H04N 7/106 725/46 |
| 2012/0030281 A1 | 2/2012 | Heyworth et al. |
| 2012/0036041 A1 | 2/2012 | Hesselink |
| 2012/0203796 A1* | 8/2012 | Abraham .............. H04W 4/185 707/770 |
| 2012/0290648 A1 | 11/2012 | Sharkey |
| 2013/0073742 A1 | 3/2013 | Piepenbrink et al. |
| 2013/0121503 A1* | 5/2013 | Ankolekar .............. H04W 4/02 381/77 |
| 2013/0165164 A1 | 6/2013 | Rowe |
| 2013/0212401 A1 | 8/2013 | Lin |
| 2013/0227003 A1 | 8/2013 | Armstrong et al. |
| 2013/0266137 A1 | 10/2013 | Blankenbeckler et al. |
| 2013/0268749 A1 | 10/2013 | Blankenbeckler et al. |
| 2013/0268759 A1 | 10/2013 | Blankenbeckler et al. |
| 2013/0268771 A1 | 10/2013 | Blankenbeckler et al. |
| 2014/0173036 A1* | 6/2014 | Das ....................... H04L 65/602 709/219 |
| 2014/0358898 A1* | 12/2014 | Lehtiniemi ....... G06F 17/30053 707/722 |
| 2015/0113022 A1* | 4/2015 | Martin .............. G06F 17/30761 707/796 |

OTHER PUBLICATIONS

Extended European Search Report dated Sep. 15, 2017 from related PCT Serial No. PCT/US2015020301, 9 pages.

* cited by examiner

CONTENT MATCHING SYSTEM FOR A NETWORKED MEDIA PLAYER

CROSS-REFERENCE TO RELATED APPLICATIONS

This application claims priority to U.S. Provisional Application No. 61/951,921, entitled "CONTENT MATCHING SYSTEM FOR NETWORKED SPEAKERS," filed on Mar. 12, 2014, which is herein incorporated by reference in its entirety.

BACKGROUND

People often have different tastes in media content, whether music, television, movies or the like. This can make selecting media content for a group of people difficult. For example, at a party, people may be forced to listen to a single speaker system and have a difficult time agreeing on selecting music to play. While a single user can control the playback of the speaker system, the music chosen by that single user may not necessarily satisfy the tastes of other listeners.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

In one embodiment, a content matching system (CMS) is configured to attempt to find content that all (or many) of the users listening to a networked speaker system would like and then play that content on the speaker system. In one embodiment, a content matching system determines when multiple users are near a registered, networked speaker system. The matching system communicates with client apps located on the users' mobile devices and identifies the users. The system then communicates with a streaming service to identify media content that is liked by both users. The system then plays the content on the networked speaker system. By automatically catering to the listeners' tastes, the content matching system can provide a beneficial user experience.

Various aspects of the content matching system will now be described with regard to certain examples and embodiments, which are intended to illustrate but not to limit the disclosure. Nothing in this disclosure is intended to imply that any particular feature or characteristic of the disclosed embodiments is essential. The scope of protection of certain inventions is defined by the claims.

Figure 1:
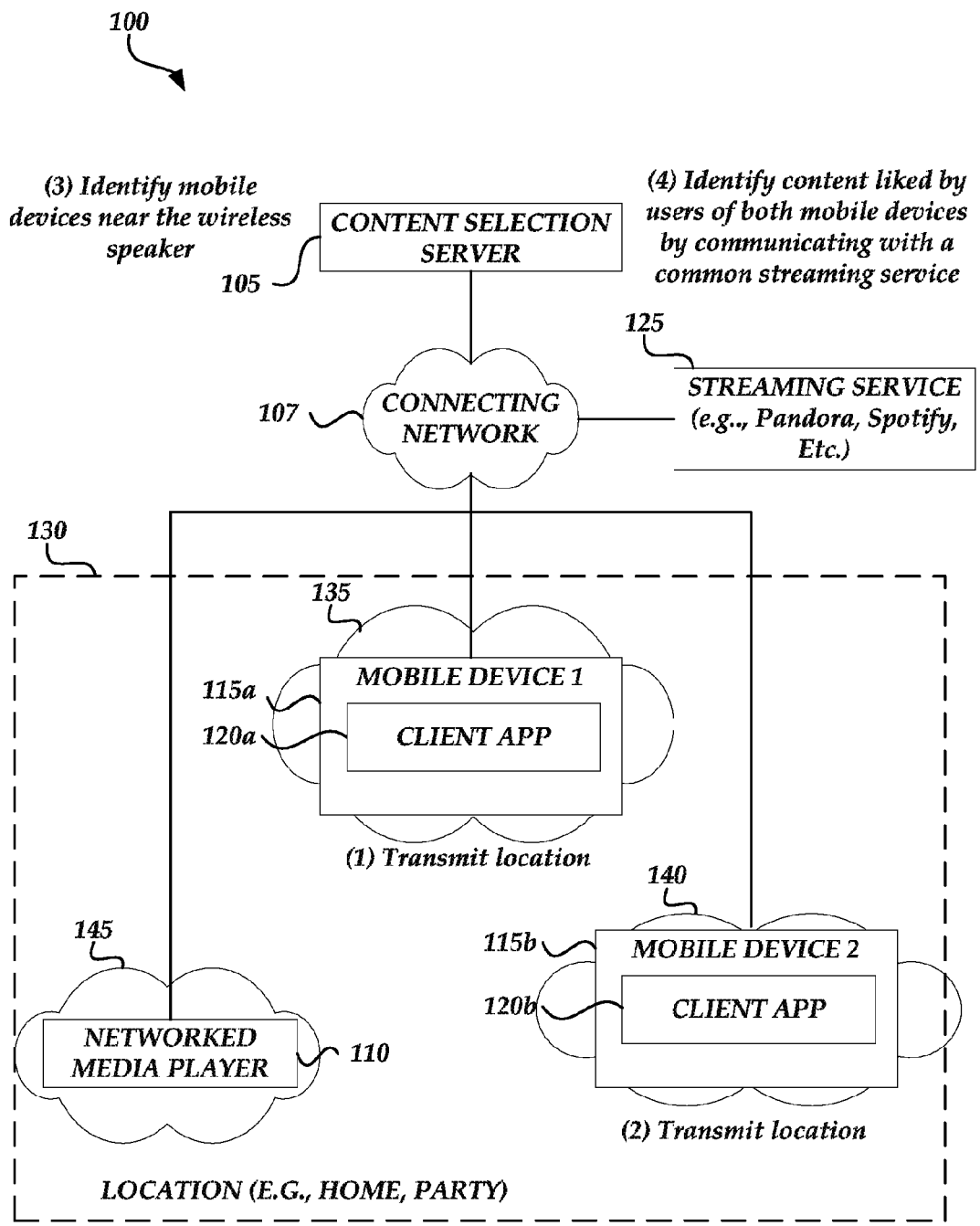
FIG. 1 illustrates a block diagram of an embodiment of a content matching system that identifies similarities in content preferences of users.

FIG. 1 illustrates one embodiment of the content matching system 100. In the illustrated embodiment, a content selection server 105 is connected via a connecting network 107 to a plurality of mobile devices 115 (115a, 115b) and a networked media player. The content selection server 105 can comprise one or more physical or virtual computing nodes. The mobile devices 115 can include tablets, wearable computing devices, smart phones and/or the like. In one embodiment, the mobile device 115 includes a client application 120 (120a, 120b) or other software that communicates with the content selection server 105. The networked media player 110 can include speakers, televisions, set-top boxes, mp3 players, streaming devices and/or the like. In one embodiment, the connecting server 105 is in communication with one or more streaming services 125 to obtain user preference information. In some implementations, the content selection server may itself store or cache user preference information in order to eliminate or reduce the need to communicate with the streaming services 125.

In an example scenario, several users are at a location 130 (e.g., home, party, meeting, event, etc.). Mobile device 1 is associated with a first user and operating on a first network 135 (e.g., a first phone carrier's network). Mobile device 2 is associated with a second user and operating on a second network 140 (e.g., a second phone carrier's network). Meanwhile, the networked media player 110 is operating on a local network 145. As the three devices are operating on different networks, the devices generally cannot directly communicate with each other without some reconfiguration. Many users, however, may not have the expertise or the information needed to reconfigure the devices. For example, users of mobile device 1 and 2 may not have the passwords or access rights to the local network 145 and therefore cannot connect to that network. However, the content selection server 105 can facilitate interoperability between the devices.

At operations (1) and (2), the client apps 120 on the mobile devices 115 transmit location information (e.g., nearby Wi-Fi SSIDs, Cell ID, GPS data, etc.) to the content selection server 105. In one embodiment, the content selection server 105 obtains and maintains location information for various networked media players 110. For example, the content selection server 105 may store network location data (e.g., IP address, network SSID, etc.) or geo-location data for the media players. In an embodiment, media players 110 are registered with the content selection server 105 and accounts created with data such as preferences, location, permissions, etc. Based on the location information from the devices, the content selection server 105 can determine when the mobile devices 115 are near the media player 110. For example, the content selection server 105 may use Wi-Fi identification or GPS data to determine when users are on the same area as the media player.

Based on the proximity of the mobile devices 115 to the networked media player 110, the content selection server 105 can determine that multiple users are in range of the same media player 110. At operation (4), the server then identifies the users of the mobile devices. For example, the content matching system may access a database or other data repository of user identity data. In another example, the content system may query an app running on the mobile device to get identify data, such as account information. Using this identify data, the system communicates with a streaming service (e.g., Pandora, Spotify, etc.) to obtain account information for the users, such as preferred genres (e.g., for music, movies or TV), favorite playlists, playback queues, playback history, and/or the like. The server 105 can then use this data to identify media content that all or a large number of the users near the networked media player 110 would like. The server then causes the media player to play the identified media content. For example, the server 105 can compare playlists for a first user and a second user, find overlaps in the playlist, generate a new playlist with the overlaps, and then transmit the new playlist to the media player. The media player can then play the content.

Figure 2:
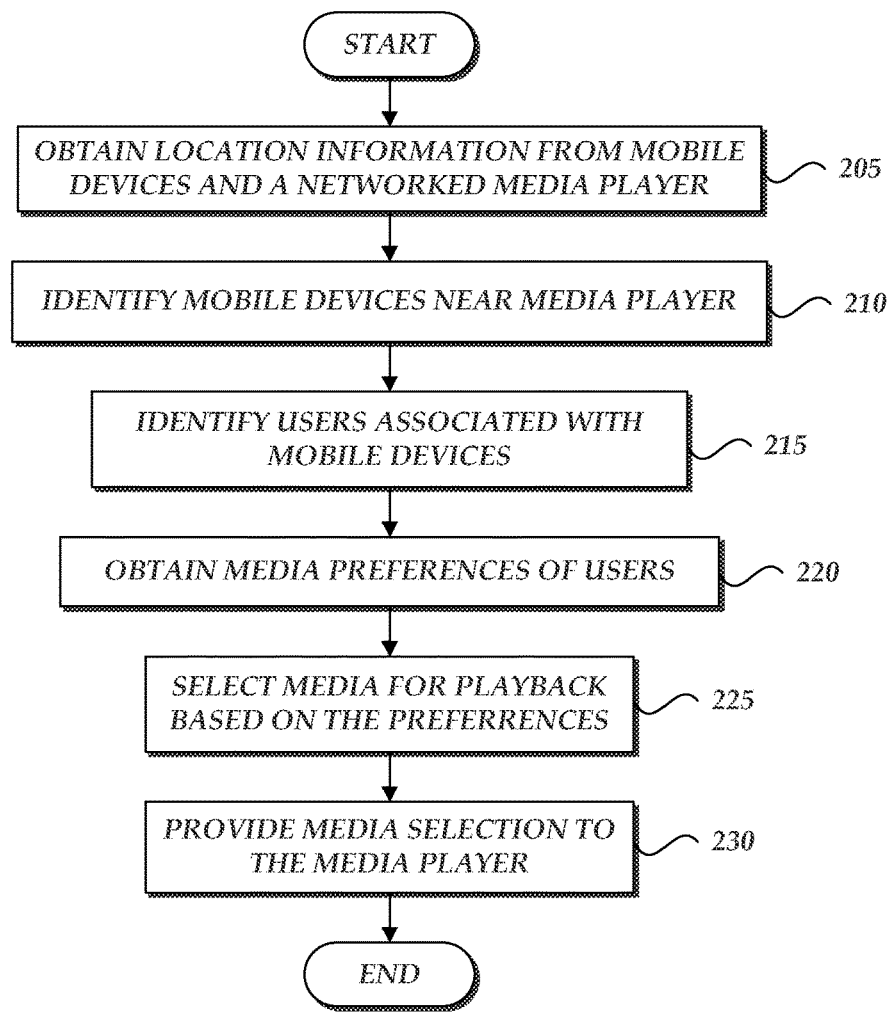
FIG. 2 illustrates a flow chart of an embodiment of a content matching process implementable by the content matching system of FIG. 1.

FIG. 2 illustrates a flow chart of an embodiment of a content matching routine 200. In some implementations, the routine is performed by embodiments of the CMS or by one of its components, such as the content selection server 105. For ease of explanation, the following describes the routine as performed by the content selection server 105. The routine is discussed in the context of an example scenario that is intended to illustrate, but not to limit, various aspects of the CMS.

Beginning at block 205, the server 105 obtains location information from mobile devices and a networked media player. For example, in one scenario, people may be listening to music while at a party on a networked speaker system and the server gets location information from people's mobile devices and the networked speaker system.

At block 210, the content selection server 105 identifies devices near the networked media player based at least partly on the location information. At any given time, the content selection server 105 may be tracking thousands or more of devices. There may be multiple content selection servers 105 if the content selection system 100 has to track a large number of users. Based on location information from the users, the content selection server 105 can determine when mobile devices are near a networked media player registered with the server 105.

At block 215, the content selection server 105 identifies users associated with the nearby mobile devices. In one embodiment, the mobile devices include client applications configured to interact with the server 105. The client apps can provide user data to the server 105. For example, the client apps may request user information from the user, such as streaming service account information. The client apps can then provide the user information to the server.

At block 220, the content selection server 105 obtains the media preferences of the users near the networked media player. For example, if the server 105 has users streaming service account information, the server 105 can communicate with the streaming services to find out the users' media preferences.

At block 225, the content selection server 105 selects media for playback based at least partly on the media preferences. For example, the server 105 may attempt to find matching media content in users playback lists, histories, or the like. The server 105 may also attempt to leverage recommendation systems, such as those utilized by many streaming services. For example, even if no exact media content matches exists, the users may have similar tastes such that recommendation systems can come up with overlapping recommendations for the users.

At block 230, the content selection server 105 provides the selected media for playback to the media player for playback. For example, the server 105 can provide a music playlist to a speaker system, a movie or television show selection to a smart TV, or an advertising display to an electronic billboard. As the media selection is based at least partly on the users' preferences, users should be more interested and engaged in the played media content.

Various implementations of the content matching system are possible. For example, while the above has discussed music, the content matching system could work with other media files, such as movies, television shows, advertising or the like. In addition, the content matching system could control playback on speakers and other types of media playback devices, such as televisions, electronic displays, tablets, mobile phones, kiosks or the like. For example, the content matching system could control an electronic display at a public area, obtain the user preferences of users near the electronic display and then select advertising that a large number of the users may be interested in.

In one embodiment, a content selection system is configured to obtain location information from a plurality of computing devices. The content selection system identifies a selection of computing devices that are within a set distance (e.g., within viewing and/or listening distance) from a networked, media playback device. The content selection system accesses account information of users associated with the selection of computing devices and obtains user preferences for media content. The content selection system selects a first media content and transmits the first media content to the networked, media playback device for playback.

Each of the processes, methods and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A system for selecting media content for playback on a networked media player communicatively connected to a local network, the system comprising:

one or more processors on a server configured to facilitate interoperability between devices communicatively connected to different communication networks, the one or more processors configured to:
- initiate data requests over one or more communication networks that occur at least partially in parallel, the data requests comprising:
  - a first data request to obtain location information of the networked media player communicatively connected to the local network; and
  - one or more additional data requests to obtain location information and streaming service account information from one or more computing devices communicatively connected to one or more networks different from the local network;
- identify a group of computing devices that are within a viewing distance or a listening distance from the networked media player based on the obtained location information from the one or more computing devices and from the networked media player, wherein a first computing device of the group of computing devices cannot directly communicate with the networked media player without reconfiguration;
- communicate, over the one or more communication networks, with one or more streaming services with associated recommendation systems to obtain media content preferences of a group of users associated with the obtained streaming service account information;
- determine whether there is matching media content in playlists of the group of users;
- in response to determining that there is no matching media content in the playlists, select a first media content for playback on the networked media player based at least partly on matching recommendations of a plurality of recommendations generated by the recommendation systems associated with the one or more streaming services; and
- provide the selected first media content to the networked media player.

2. The system of claim 1, wherein the networked media player comprises at least one of a speaker system, a television, or a streaming device.

3. The system of claim 1, wherein the computing devices comprise at least one of a smart phone, a wearable computing device, or a tablet.

4. The system of claim 1, wherein the location information comprises at least one of Wi-Fi data, Cell ID, or GPS data.

5. The system of claim 1,
wherein selecting the first media content comprises identifying overlaps in the media content preferences of the group of users.

6. The system of claim 1, wherein obtaining the media content preferences of the group of users comprises:
accessing streaming service accounts for each user of the group of users; and
obtaining the media content preferences stored by the streaming service accounts.

7. The system of claim 1, wherein one or more of the viewing distance or the listening distance comprises a distance at which the group of users are able to interact with the networked media player.

8. The system of claim 1, wherein the media content preferences comprise at least one of media playback history of playlists.

9. A method for selecting media content for playback on a networked media player communicatively connected to a local network, the method comprising:
- on a server configured to facilitate interoperability between devices communicatively connected to different communication networks, initiating data requests over one or more communication networks that occur at least partially in parallel, the data requests comprising:
  - a first data request to obtain location information of the networked media player communicatively connected to the local network; and
  - one or more additional data requests to obtain location information and streaming service account information from one or more computing devices communicatively connected to one or more networks different from the local network;
- identifying, on the server, a group of computing devices that are within a viewing distance or a listening distance from the networked media player based on the obtained location information from the one or more computing devices and from the networked media player, wherein a first computing device of the group of computing devices cannot directly communicate with the networked media player without reconfiguration;
- communicating, over the one or more communication networks, with one or more streaming services with associated recommendation systems to obtain media content preferences of a group of users associated with the obtained streaming service account information;
- determining whether there is matching media content in playlists of the group of users;
- in response to determining that there is no matching media content in the playlists, selecting a first media content for playback on the networked media player based at least partly on matching recommendations of a plurality of recommendations generated by the recommendation systems associated with the one or more streaming services; and
- providing the selected first media content to the networked media player.

10. The method of claim 9, wherein the networked media player comprises at least one of a speaker system, a television, or a streaming device.

11. The method of claim 9, wherein the computing devices comprise at least one of a smart phone, a wearable computing device, or a tablet.

12. The method of claim 9, wherein the location information comprises at least one of Wi-Fi data, Cell ID, or GPS data.

13. The method of claim 9,
wherein selecting the first media content comprises identifying overlaps in the media content preferences of the group of users.

14. The method of claim 9, wherein obtaining the media content preferences of the group of users comprises:
accessing streaming service accounts for each user of the group of users; and
obtaining the media content preferences stored by the streaming service accounts.

15. The method of claim 9, wherein the media content preferences comprise at least one of media playback history or playlists.

16. A non-transitory computer-readable medium storing computer-readable instructions that, when executed by a processor on a server configured to facilitate interoperability between devices communicatively connected to different communication networks, instruct the processor to execute steps comprising:
    initiating data requests over one or more communication networks that occur at least partially in parallel, the data requests comprising:
        a first data request to obtain location information of a networked media player communicatively connected to a local network; and
        one or more additional data requests to obtain location information and streaming service account information from one or more computing devices communicatively connected to one or more networks different from the local network;
    identifying a group of computing devices that are within a viewing distance or a listening distance from the networked media player based on the obtained location information from the one or more computing devices and from the networked media player, wherein a first computing device of the group of computing devices cannot directly communicate with the networked media player without reconfiguration;
    communicating, over the one or more communication networks, with one or more streaming services with associated recommendation systems to obtain media content preferences of a group of users associated with the obtained streaming service account information;
    determining whether there is matching media content in playlists of the group of users;
    in response to determining that there is no matching media content in the playlists, selecting a first media content for playback on the networked media player based at least partly on matching recommendations of a plurality of recommendations generated by the recommendation systems associated with the one or more streaming services; and
    providing the selected first media content to the networked media player.

17. The computer-readable medium of claim 16, wherein the networked media player comprises at least one of a speaker system, a television, or a streaming device.

18. The computer-readable medium of claim 16, wherein the location information comprises at least one of Wi-Fi data, Cell ID, or GPS data.

19. The computer-readable medium of claim 16, wherein selecting the first media content comprises identifying overlaps in the media content preferences of the group of users.

20. The computer-readable medium of claim 16, wherein obtaining the media content preferences of the group of users comprises:
    accessing streaming service accounts for each user of the group of users; and
    obtaining the media content preferences stored by the streaming service accounts.

* * * * *